United States Patent
Wu et al.

(10) Patent No.: US 9,591,278 B2
(45) Date of Patent: Mar. 7, 2017

(54) PROJECTION SYSTEM AND PROJECTION CONTROL METHOD

(71) Applicants: Yu-Chi Wu, Hsin-Chu (TW); Wen-Chang Chien, Hsin-Chu (TW)

(72) Inventors: Yu-Chi Wu, Hsin-Chu (TW); Wen-Chang Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 79 days.

(21) Appl. No.: 14/659,633

(22) Filed: Mar. 17, 2015

(65) Prior Publication Data

US 2015/0365641 A1  Dec. 17, 2015

(30) Foreign Application Priority Data

Jun. 17, 2014 (CN) .......................... 2014 1 0269935

(51) Int. Cl.
  *H04N 9/31* (2006.01)
  *G06F 1/32* (2006.01)

(52) U.S. Cl.
  CPC ............. *H04N 9/31* (2013.01); *G06F 1/3206* (2013.01)

(58) Field of Classification Search
  CPC ................................ H04N 9/31; G06F 1/3206
  See application file for complete search history.

(56) References Cited

U.S. PATENT DOCUMENTS

| | | | |
|---|---|---|---|
| 2002/0080090 A1* | 6/2002 | Borgstom | G08C 17/02 345/1.1 |
| 2003/0117532 A1* | 6/2003 | Karasawa | H04N 5/44582 348/734 |
| 2008/0039063 A1* | 2/2008 | Ichieda | H04L 67/36 455/420 |
| 2011/0069240 A1* | 3/2011 | Su | H04N 9/3179 348/744 |
| 2011/0242503 A1* | 10/2011 | Su | G03B 21/2026 353/85 |
| 2013/0132859 A1 | 5/2013 | Chou et al. | |
| 2013/0272224 A1* | 10/2013 | Ogawara | H04W 76/021 370/329 |

FOREIGN PATENT DOCUMENTS

TW  I296755  5/2008
TW  201137664  11/2011

* cited by examiner

*Primary Examiner* — Stefan Stoynov
(74) *Attorney, Agent, or Firm* — Jianq Chyun IP Office

(57) ABSTRACT

A projection system and a projection control method are provided. The projection system includes a projection apparatus and a projection data providing apparatus. After receiving projection data, the projection apparatus enters an operating mode from a sleep mode and projects an image light beam according to the projection data. The projection data providing apparatus determines whether an input operation is received, and transmits the projection data to the projection apparatus if the input operation is received.

21 Claims, 6 Drawing Sheets

PROJECTION SYSTEM AND PROJECTION CONTROL METHOD

CROSS-REFERENCE TO RELATED APPLICATION

This application claims the priority benefit of Chinese application serial no. 201410269935.X, filed on Jun. 17, 2014. The entirety of the above-mentioned patent application is hereby incorporated by reference herein and made a part of this specification.

BACKGROUND

Field of the Invention

The invention is directed to a display apparatus and a control method thereof. More particularly, the invention is directed to a projection system and a projection control method.

Description of Related Art

In occasions of using a projector, such as in a conference or in class, the projector is commonly turned off temporarily for waiting for all people in attendance or equipment or data getting ready. However, once the projector is disconnected from other electronic apparatuses, the complicated setting process has to be performed again, which causes much inconvenience to users and also fails to meet demands of energy saving and environmental protection if the projector keeps on.

U.S. Publication No. 20130132859A1, Taiwan Patent No. 1296755, and Taiwan Publication No. 201137664 are disclosures related to a projection apparatus.

The information disclosed in this BACKGROUND section is only for enhancement of understanding of the BACKGROUND of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The invention provides a projection system and a projection control method capable to improve the convenience of use of the projection apparatus and to meet demands of energy saving and environment protection.

Other objectives and advantages of the invention can be further understood by the disclosures of the invention.

To achieve one of, a part of or all of the above-mentioned advantages, or to achieve other advantages, an embodiment of the invention provides a projection system including a projection apparatus and a projection data providing apparatus. The projection apparatus is configured to enter an operating mode from a sleep mode after receiving projection data and project an image light beam according to the projection data. The projection data providing apparatus is configured to determine whether an input operation is received and transmit the projection data to the projection apparatus if the input operation is received.

In an embodiment of the invention, the projection data providing apparatus further transmits a projection instruction to the projection apparatus, and the projection apparatus further enters the operating mode from the sleep mode according to the projection instruction.

In an embodiment of the invention, the projection apparatus includes a projection unit, a communication unit, and a processing unit. The projection unit projects the image light beam. The communication unit receives the projection data. The processing unit is coupled with the projection unit and the communication unit, and drives a projection control module. The projection control module controls the projection apparatus to enter the operating mode from the sleep mode and controls the projection unit to project the image light beam according to the projection data.

In an embodiment of the invention, the projection data providing apparatus includes a storage unit, a communication unit, and a processing unit. The storage unit stores the projection data. The communication unit transmits the projection data. The processing unit is coupled with the storage unit and the communication unit, and drives the projection data processing module. The projection data processing module determines whether the input operation is received, and the processing unit controls the communication unit to transmit the projection data to the projection apparatus if the input operation is received. In an embodiment, the processing unit is further connected to a network storage apparatus through the communication unit and receives the projection data from the network storage apparatus.

In an embodiment of the invention, after determining that the input operation is received, the projection data providing apparatus further searches for the projection apparatus according to connection setting data for a wireless connection between the projection data providing apparatus and the projection apparatus and transmits the projection data to the projection apparatus after the projection data providing apparatus and the projection apparatus are connected with each other, and the projection apparatus enters the operating mode from the sleep mode according to the projection data.

In an embodiment of the invention, after determining that the input operation is received, the projection data providing apparatus further searches for the projection apparatus according to connection setting data for a wireless connection between the projection data providing apparatus and the projection apparatus and transmits the projection instruction and the projection data to the projection apparatus after the projection data providing apparatus and the projection apparatus are connected with each other, and the projection apparatus enters the operating mode from the sleep mode according to the projection instruction.

In an embodiment of the invention, the projection apparatus includes a projection unit, a communication unit, and a processing unit. The projection unit projects the image light beam. The communication unit communicates with the projection data providing apparatus in a wireless connection, and receives the projection instruction and the projection data. The processing unit is coupled with the projection unit and the communication unit, and drives the projection control module. The projection control module controls the projection apparatus to enter the operating mode from the sleep mode according to the projection instruction and controls the projection unit to project the image light beam according to the projection data.

In an embodiment of the invention, the projection data providing apparatus includes a storage unit, a communication unit, and a processing unit. The storage unit stores connection setting data. The communication unit communicates with the projection apparatus in a wireless connection. The processing unit is coupled with the storage unit and the communication unit, and drives the projection data processing module. The projection data processing module determines whether the input operation is received and controls the communication unit to search for the projection apparatus according to the connection setting data if the input operation is received, and the projection instruction and the projection data are transmitted to the projection apparatus through the communication unit after the communication unit and the projection apparatus are connected with each other. In an embodiment of the invention, the processing unit is further connected to a network storage apparatus through the communication unit and receives the projection data from the network storage apparatus.

In an embodiment of the invention, the projection apparatus enters the sleep mode from the operating mode according to a sleep instruction.

In an embodiment of the invention, the projection data providing apparatus is a touch apparatus, and the input operation is a touch operation.

In an embodiment of the invention, the projection data providing apparatus has a physical button or a virtual button, and the input operation is an operation of pressing the physical button or the virtual button.

The invention provides a projection control method applied to a projection apparatus having an operating mode and a sleep mode. The projection control method includes the following steps. Whether an input operation is received is determined. If the input operation is received, projection data is transmitted to the projection apparatus to control the projection apparatus to enter the operating mode from the sleep mode and to project according to the projection data.

In an embodiment of the invention, the projection control method further includes the following step. A projection instruction is transmitted to the projection apparatus to control the projection apparatus to enter the operating mode from the sleep mode according to the projection instruction.

In an embodiment of the invention, the projection control method further includes the following step. The projection apparatus is searched according to connection setting data to establish a wireless connection between the projection data providing apparatus capable of providing the projection data and the projection apparatus.

In an embodiment of the invention, the projection control method further includes the following step. A sleep instruction is sent to the projection apparatus to control the projection apparatus to enter the sleep mode from the operating mode.

In an embodiment of the invention, the step of controlling the projection apparatus to enter the operating mode from the sleep mode and to project according to the projection data is performed by executing a projection control module.

In an embodiment of the invention, the step of determining whether the input operation is received and the step of transmitting the projection data to the projection apparatus if the input operation is received are performed by executing a projection data processing module.

In an embodiment of the invention, the projection control method further includes the following step. The projection data is received from a network storage apparatus.

In an embodiment of the invention, the input operation is a touch operation.

In an embodiment of the invention, the input operation is an operation of pressing the physical button or the virtual button.

Based on the above, in the embodiments of the invention, the projection apparatus enters the sleep mode, and the projection data providing apparatus transmits the projection data to the projection apparatus when receiving the input operation, such that the projection apparatus enters the operating mode from the sleep mode for projection. Thereby, the convenience of use of the projection apparatus may be improved, and the demands of energy saving and environment protection may also be met.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
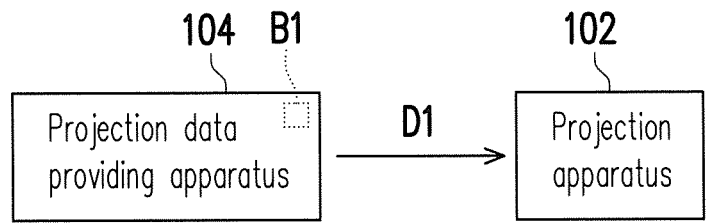
FIG. 1A is a schematic diagram illustrating a projection system according to an embodiment of the invention.

Referring to FIG. 1A, a projection system 100 includes a projection apparatus 102 and a projection data providing apparatus 104. The projection apparatus 102 may be, for example, a liquid crystal projector (LCP), a digital light projector (DLP), a reflective liquid crystal projector (e.g., a liquid crystal on silicon (LCOS) projector, or the like. The projection data providing apparatus 104 may be a notebook computer, a mobile phone, a tablet computer or any other electronic apparatus capable of providing projection data D1.

The projection apparatus 102 may be connected with the projection data providing apparatus 104 in a wired or a wireless connection and project an image light beam on a projection plane according to the projection data D1 provided by the projection data providing apparatus 104 to display a projected image. In the embodiment, the projection apparatus 102 has a sleep mode and an operating mode. Specifically, when the projection apparatus 102 enters the sleep mode from the operating mode, an overall power loss of the projection apparatus 102 may be lowered down to be less than 10% through reducing operation performance (e.g., reducing luminance of a light source thereof down to 2% of an upper luminance threshold) or even disabling some functions (e.g., disconnecting the connection with the projection data providing apparatus 104). Additionally, a timing of the projection apparatus 102 entering the sleep mode may be that when a sleep instruction is received, wherein the sleep instruction may be sent from the projection data providing apparatus 104 or through pressing a sleep button (not shown) disposed on the projection apparatus 102, for example. In some embodiments, whether to enter the sleep mode may be determined according to the projection data D1 received by the projection apparatus 102 itself. For example, when the projection data D1 has been unreceived or contents of the received projection data D1 are the same for a predetermined time period, the projection apparatus 102 enters the sleep mode.

In the embodiment, after the projection apparatus 102 enters the sleep mode, the projection data providing apparatus 104 may determine whether an input operation is received. The projection data providing apparatus 104 transmits the projection data D1 to the projection apparatus 102 if the input operation is received, such that the projection apparatus 102 enters the operating mode from the sleep mode and projects the image light beam according to the projection data D1 provided by the projection data providing apparatus 104.

Figure 1B:
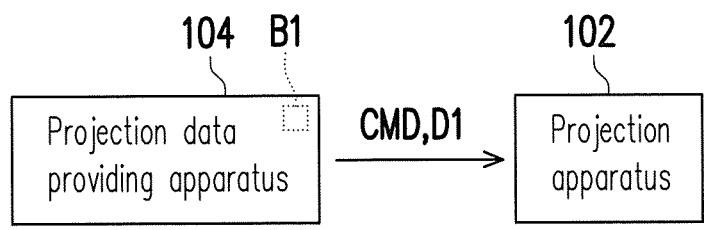
FIG. 1B is a schematic diagram illustrating a projection system according to another embodiment of the invention.

In other embodiments, referring to FIG. 1B, the projection data providing apparatus 104 may further transmit a projection instruction CMD to the projection apparatus 102. The projection apparatus 102 enters the operating mode from the sleep mode according to the projection instruction CMD and projects the image light beam according to the projection data D1 provided by the projection data providing apparatus 104.

Referring to both FIG. 1A and FIG. 1B, if the projection apparatus 102 is connected with the projection data providing apparatus 104 in the wireless manner, the projection data providing apparatus 104 may further store connection setting data for the wireless connection between the projection data providing apparatus 104 and the projection apparatus 102. After the projection apparatus 102 enters the sleep mode, the projection data providing apparatus 104 may determine whether the input operation is received. If the input operation is received, the projection data providing apparatus 104 searches for the projection apparatus 102 according to the connection setting data for the wireless connection between the projection data providing apparatus 104 and the projection apparatus 102 to automatically connect with the projection apparatus 102 in the wireless manner. After the projection data providing apparatus 104 and the projection apparatus 102 are connected with each other in the wireless manner, the projection data providing apparatus 104 transmits the projection data D1 (or the projection data D1 together with the projection instruction CMD) to the projection apparatus 102, such that the projection apparatus 102 enters the operating mode from the sleep mode according to the projection data D1 and/or the projection instruction CMD and projects the image light beam according to the projection data D1 provided by the projection data providing apparatus 104.

In the embodiment, the projection data providing apparatus 104 may be provided with a button B1 (as shown in FIG. 1A and FIG. 1B), and the input operation is an operation of pressing the button B1. The projection data providing apparatus 104 transmits the projection data D1 and/or the projection instruction CMD to the projection apparatus 102 when the button B1 is pressed. The button B1 may be, for example, a virtual button or a physical button, and the virtual button may be displayed on a touch region of the projection data providing apparatus 104. In some embodiments, the input operation may be, for example, a touch operation, and that is, the projection data providing apparatus 104 of the embodiment may be a touch apparatus having a touch function. When a touch operation occurring through any position on the touch region is determined by the projection data providing apparatus 104, the projection data D1 and/or the projection instruction CMD may be transmitted to the projection apparatus 102.

Figure 2A:
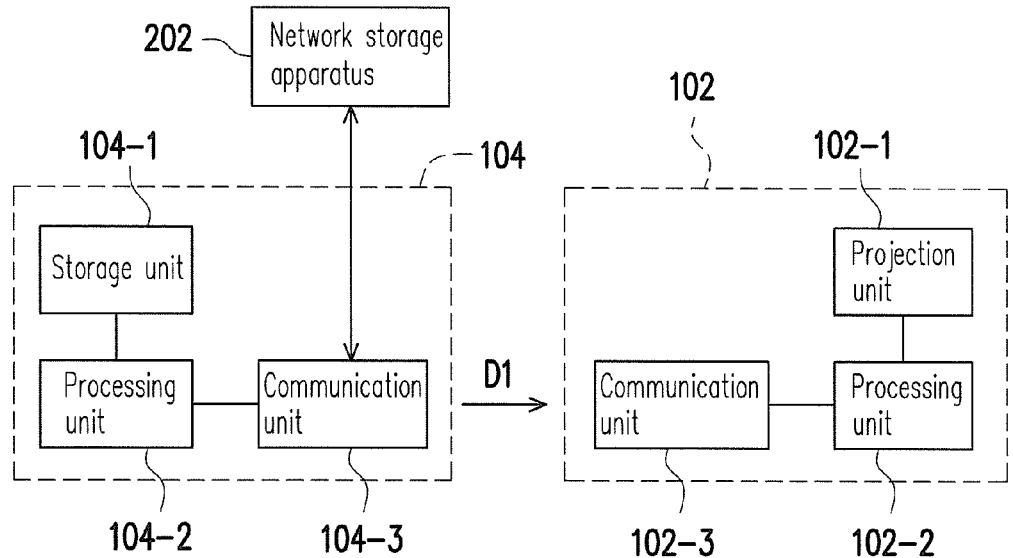
FIG. 2A is a schematic diagram illustrating a projection system according to yet another embodiment of the invention.

Referring to FIG. 2A, in the embodiment, a projection apparatus 102 may include, for example, a projection unit 102-1, a processing unit 102-2, and a communication unit 102-3. The projection unit 102-1 is configured to project an image light beam. The communication unit 102-3 is configured to receive projection data D1. The processing unit 102-2 is coupled with the projection unit 102-1 and the communication unit 102-3. In the embodiment, the communication unit 102-3 may be, for example, embedded in the projection apparatus 102 or disposed outside to connect with the projection apparatus 102 implemented as a dongle, for example. On the other hand, the projection data providing apparatus 104 may include, for example, a storage unit 104-1, a processing unit 104-2, and a communication unit 104-3. The storage unit 104-1 is configured to store the projection data D1. The communication unit 104-3 is configured to transmit the projection data D1. The processing unit 104-2 is coupled with the storage unit 104-1 and the communication unit 104-3. The processing units 102-2 and 104-2 of the embodiment may be a central processing unit (CPU), a micro-processor, a controller, a micro-controller unit, a digital signal processor (DSP), a programmable controller, an application specific integrated circuit (ASIC), a programmable logic device (PLD), a processing software or a control software.

Accordingly, the processing unit 102-2 is configured to drive a projection control module, wherein the projection control module controls the projection apparatus 102 to enter the operating mode from the sleep mode according to the projection data D1 and controls the projection unit 102-1 to project the image light beam. On the other hand, the processing unit 104-2 is configured to drive the projection data processing module, wherein the projection data processing module determines whether an input operation is received, and the processing unit 104-2 controls the communication unit 104-3 to transmit the projection data D1 to the projection apparatus 102 if the input operation is received. To be more detailed, the processing unit 102-2 of the projection apparatus 102 is configured to drive the projection control module to control the projection apparatus 102 to enter the operating mode from the sleep mode after the communication unit 102-3 receives the projection data D1 and to control the projection unit 102-1 to project the image light beam according to the projection data D1. The processing unit 104-2 of the projection data providing apparatus 104 is configured to drive the projection data processing module to determine whether the above input operation is received, and transmits the projection data D1 to the projection apparatus 102 through the communication unit 104-3 after the communication unit 104-3 and the projection apparatus 102 are connected with each other if receiving the input operation is determined. The projection data D1 may be obtained not only from the storage unit 104-1, for example, but also from a network storage apparatus 202 (e.g., a cloud server) connected with the communication unit 104-3 in some embodiments. Therein, the communication unit 104-3 and the network storage apparatus 202 may be connected with each other in a wired or a wireless manner.

The projection control module is, for example, a program code segment written in a computer programming language, and the program code segment may be stored in, for example, a storage unit (not shown) of the projection apparatus 102 and may include a plurality of instructions. As such, in the embodiment, the program code segment may be executed by the processing unit 102-2 to drive the projection control module. Additionally, in other embodiments, the projection control module may be a hardware component composed of one or more circuits coupled to the processing unit 102-2 and driven by the processing unit 102-2. On the other hand, the projection data processing module may be, for example, a program code segment written by a computer programming language stored in, for example, a storage unit (not shown) of the projection data providing apparatus 104 and may include a plurality of instructions. As such, in the embodiment, the program code segment may be executed by the processing unit 104-2 to drive the projection data processing module. Additionally, in other embodiments, the projection data processing module may be a hardware component composed of one or more circuits coupled to the processing unit 104-2 and driven by the processing unit 104-2.

Figure 2B:
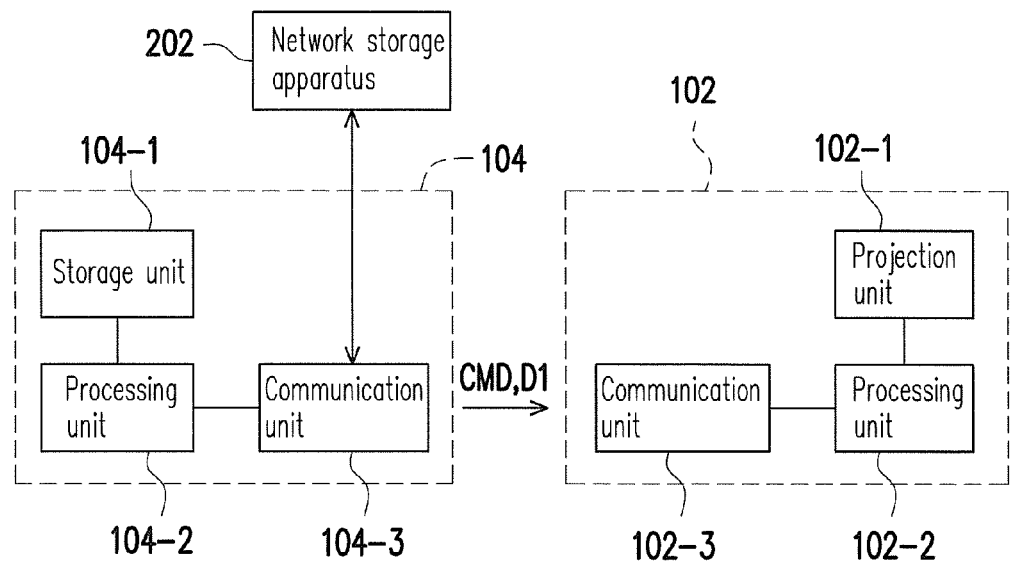
FIG. 2B is a schematic diagram illustrating a projection system according to still another embodiment of the invention.

In some other embodiments, referring to FIG. 2B, the projection data providing apparatus 104 may further transmit the projection instruction CMD to the projection apparatus 102. The processing unit 102-2 of the projection apparatus 102 may receive the projection instruction CMD and the projection data D1 through the communication unit 102-3, drive the projection control module to control the projection apparatus 102 to enter the operating mode from the sleep mode according to the projection instruction CMD after the projection instruction CMD and projection data D1 is received, and control the projection unit 102-1 to project according to the projection data D1.

Referring to both FIG. 2A and FIG. 2B, in other embodiments, when the projection apparatus 102 and the projection data providing apparatus 104 are connected with each other in the wireless manner, the communication unit 102-3 of the projection apparatus 102 is configured to communicate with the communication unit 104-3 of the projection data providing apparatus 104 through the wireless connection to receive the projection data D1 or the projection data D1 together with the projection instruction CMD. Additionally, the storage unit 104-1 of the projection data providing apparatus 104 may store connection setting data for the wireless connection between the projection data providing apparatus 104 and the projection apparatus 102. Thus, the projection data providing apparatus 104 may search for the projection apparatus 102 according to the connection setting data, such that the projection data providing apparatus 104 and the projection apparatus 102 are connected with each other in the wireless manner. The data stored in the storage unit 104-1 is not limited to the connection setting data, and in other embodiments, the storage unit 104-1 may further store the projection data D1, for example. Moreover, in the embodiment illustrated in FIG. 2A, the processing unit 104-2 may transmit the projection data D1 to the projection apparatus 102 through the communication unit 104-3, and the processing unit 102-2 may receive the projection data D1 through the communication unit 102-3 to drive the projection control module to control the projection apparatus 102 to enter the operating mode from the sleep mode according to the projection data D1 and control the projection unit 102-1 to project. In the embodiment illustrated in FIG. 2B, the processing unit 104-2 may not only transmit the projection data D1 but also the projection instruction CMD to the projection apparatus 102 through the communication unit 104-3, and the processing unit 102-2 may receive the projection instruction CMD and the projection data D1 through the communication unit 102-3 to drive the projection control module to control the projection apparatus 102 to enter the operating mode from the sleep mode according to the projection instruction CMD and control the projection unit 102-1 to project the image light beam according to the projection data D1.

Figure 3A:
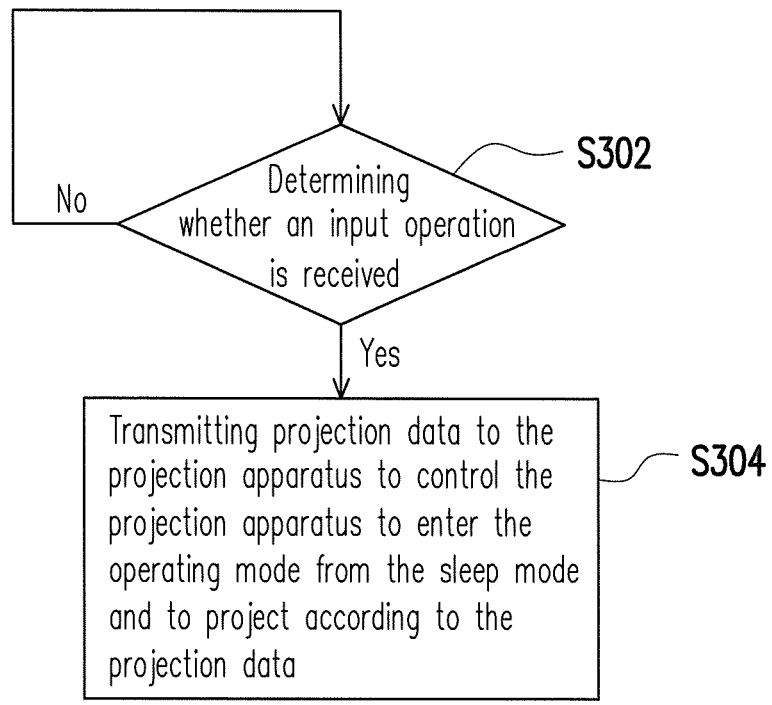
FIG. 3A is a flowchart illustrating a projection control method according to an embodiment of the invention.

Referring to FIG. 3A, a projection control method for the projection system described in any one of the embodiments above is provided and may include the following steps. First, whether an input operation is received is determined (step S302). In the embodiment, the input operation may be, for example, a touch operation or an operation of pressing a physical button or a virtual button. If it is determined that the input operation is received, projection data is transmitted to a projection apparatus to control the projection apparatus to enter an operating mode from a sleep mode and to project projection according to the projection data (step S304). Otherwise, if it is determined that no input operation is received, step S302 is returned to, and whether the input operation is received is continuously determined.

Figure 3B:
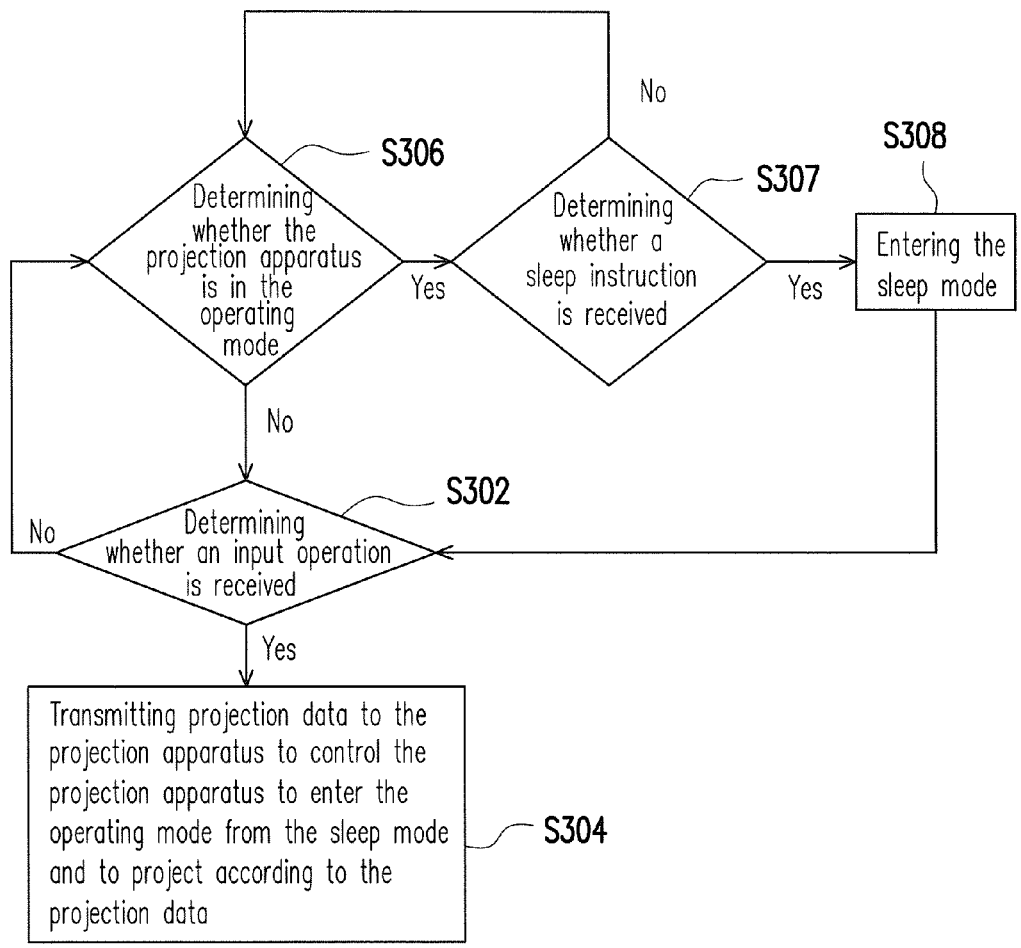
FIG. 3B is a flowchart illustrating a projection control method according to another embodiment of the invention.

In other embodiments, referring to FIG. 3B, if it is determined that no input operation is received in step S302, whether the projection apparatus is in the operating mode is further determined (step S306). If it is determined that the projection apparatus is not in the operating mode (but in the sleep mode, for example), step S302 is returned to, and whether the input operation is received is continuously determined. If it is determined that the projection apparatus is in the operating mode and if it is further determined that a sleep instruction is received (step S307), the sleep mode is entered (step S308). If it is determined that the projection apparatus is in the operating mode but if it is further determined that the sleep instruction is not received (step S307), step S306 is returned to, and whether the projection apparatus is in the operating mode is continuously determined.

Figure 4:
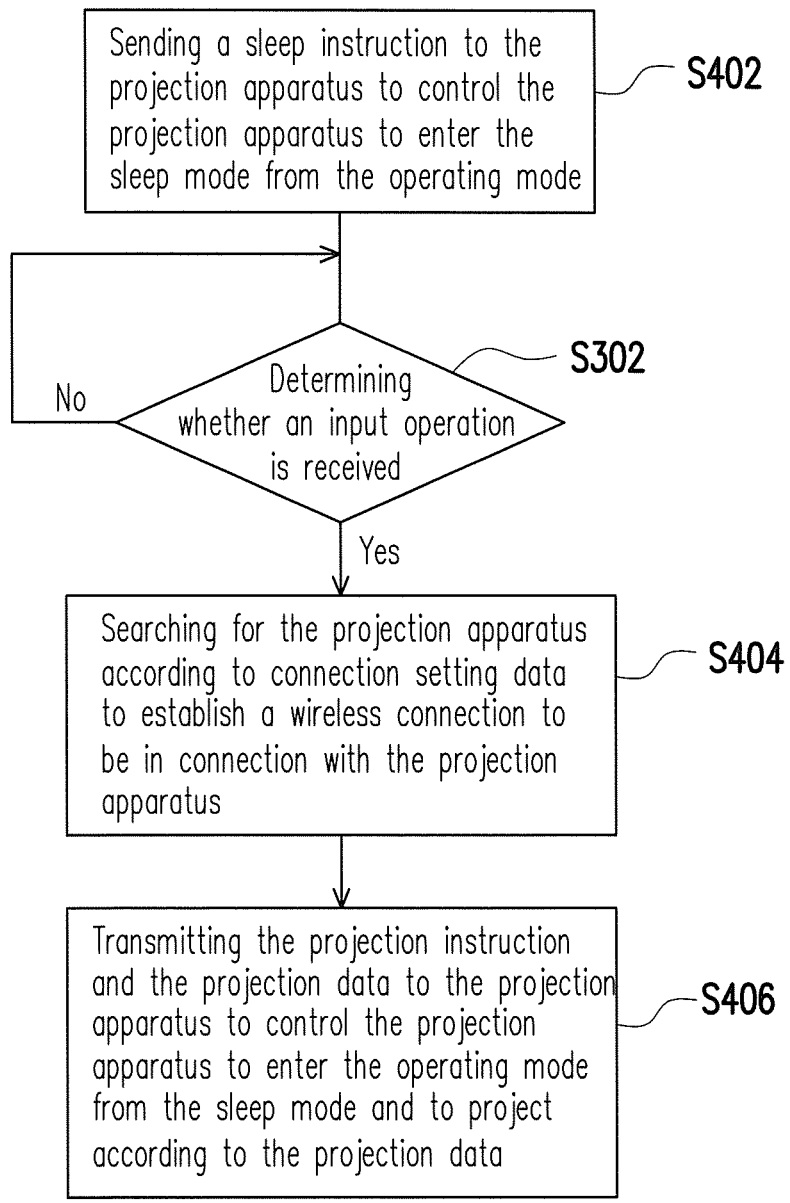
FIG. 4 is a flowchart illustrating a projection control method according to yet another embodiment of the invention.

Referring to FIG. 4, before step S302, the projection apparatus is controlled to enter the sleep mode from the operating mode by sending a sleep instruction to the projection apparatus (step S402) in the embodiment. After step S302, the projection apparatus is searched according to the connection setting data to establish a wireless connection to be in connection with the projection apparatus (step S404). Thereafter, a projection instruction and the projection data are transmitted to the projection apparatus to control the projection apparatus to enter the operating mode from the sleep mode and to project according to the projection data (step S406). In the embodiment, the step of controlling the projection apparatus to enter the operating mode from the sleep mode and project according to the projection data may be performed by executing a projection control module, for example. Details with respect to the implementation of the projection control module may refer to the embodiments above and will not repeat hereinafter.

The step of determining whether the input operation is received, the step of transmitting the projection data to the projection apparatus if the input operation is received, the step of searching for the projection apparatus according to the connection setting data to establish the wireless connection with the projection apparatus if the input operation is received, and the step of transmitting the projection instruction and the projection data to the projection apparatus if the input operation is received may be performed through executing the projection data processing module, for example. Moreover, the step of controlling the projection apparatus to enter the operating mode from the sleep mode and to project according to the projection data may be performed through executing the projection control module, for example.

Figure 5:
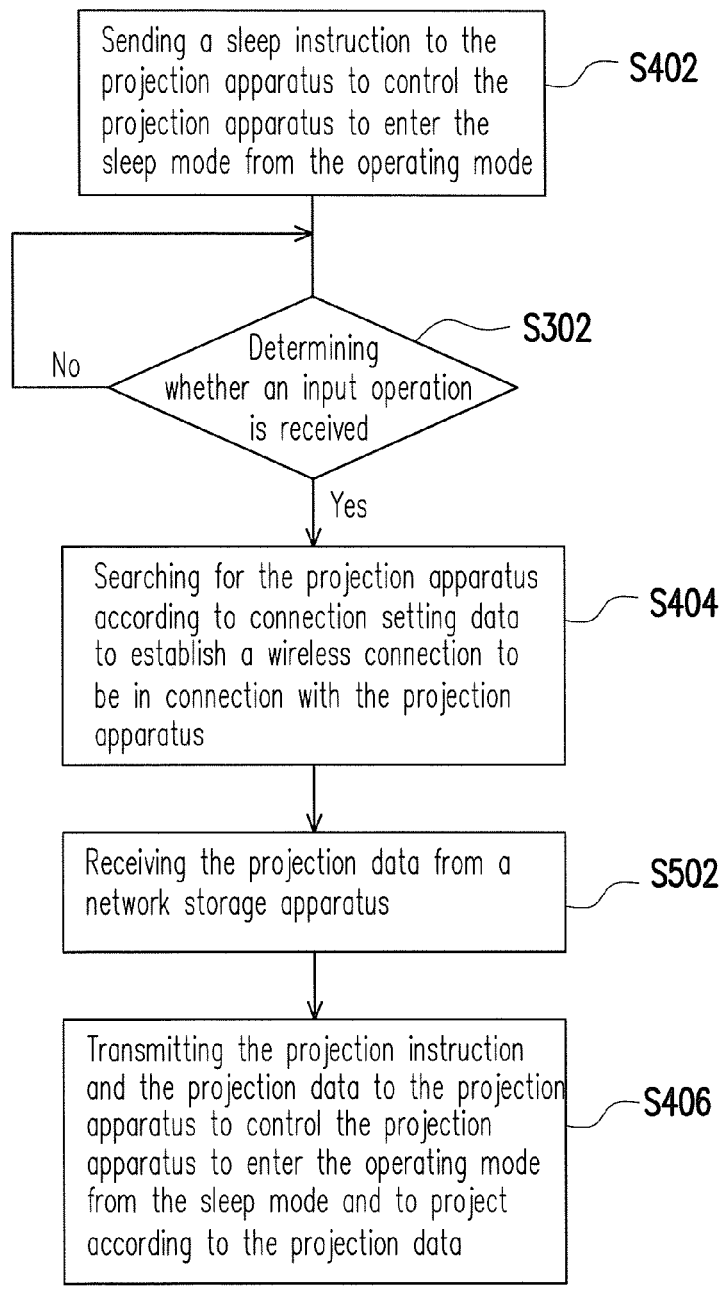
FIG. 5 is a flowchart illustrating a projection control method according to still another embodiment of the invention.

Referring to FIG. 5, in the embodiment, the embodiment illustrated in FIG. 5 further includes step S502 (in comparison with the embodiment illustrated in FIG. 4): the projection data is received from a network storage apparatus. In detail, after the wireless connection with the projection apparatus is established in step S404, the projection data is first received from the network storage apparatus (step S502). And then step S406 is entered, where the projection instruction and the projection data are transmitted to the projection apparatus to control the projection apparatus to enter the operating mode from the sleep mode and to project according to the projection data. In some embodiments, the projection data may also be obtained from a storage unit of a projection data providing apparatus and is not limited to being obtained from the network storage apparatus.

To sum up, in the embodiments of the invention, the projection apparatus enters the sleep mode, and the projection data providing apparatus transmits the projection data to the projection apparatus when receiving the input operation, such that the projection apparatus enters the operating mode from the sleep mode for projection. Thereby, the convenience of use of the projection apparatus may be improved, and the demands of energy saving and environment protection may also be met. In the embodiments of the invention, the projection data providing apparatus may further transmit the projection instruction to the projection apparatus, such that the projection apparatus enters the operating mode from the sleep mode according to the projection instruction. In the embodiments of the invention, the projection data providing apparatus may further search for the projection apparatus according to the connection setting data for the wireless connection between the projection data providing apparatus and the projection apparatus and transmit the projection data to the projection apparatus after the projection data providing apparatus and the projection apparatus are connected with each other, such that the projection apparatus enter the operating mode from the sleep mode according to the projection data.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
   a projection apparatus, configured to enter an operating mode from a sleep mode after receiving projection data, and project an image light beam according to the projection data; and
   a projection data providing apparatus, configured to determine whether an input operation is received, and transmit the projection data to the projection apparatus if the input operation is received,
   wherein after determining that the input operation is received, the projection data providing apparatus further searches for the projection apparatus according to connection setting data for a wireless connection between the projection data providing apparatus and the projection apparatus and transmits the projection data to the projection apparatus after the projection data providing apparatus and the projection apparatus are connected with each other, and the projection apparatus enters the operating mode from the sleep mode according to the projection data.

2. The projection system according to claim 1, wherein the projection data providing apparatus further transmits a projection instruction to the projection apparatus, and the projection apparatus further enters the operating mode from the sleep mode according to the projection instruction.

3. The projection system according to claim 1, wherein the projection apparatus comprises:
   a projection unit, projecting the image light beam;
   a communication unit, receiving the projection data; and
   a processing unit, coupled with the projection unit and the communication unit, and driving a projection control circuit, wherein the projection control circuit controls the projection apparatus to enter the operating mode from the sleep mode and controls the projection unit to project the image light beam according to the projection data, and the projection control circuit is coupled to the processing unit.

4. The projection system according to claim 1, wherein the projection data providing apparatus comprises:
   a storage unit, storing the projection data;
   a communication unit, transmitting the projection data; and
   a processing unit, coupled with the storage unit and the communication unit, driving a projection data processing circuit, wherein the projection data processing circuit determines whether the input operation is received, the processing unit controls the communication unit to transmit the projection data to the projection apparatus if the input operation is received, and the projection data processing circuit is coupled to the processing unit.

5. The projection system according to claim 4, wherein the processing unit is further connected to a network storage apparatus through the communication unit and receives the projection data from the network storage apparatus.

6. The projection system according to claim 1, wherein after determining that the input operation is received, the projection data providing apparatus further searches for the projection apparatus according to the connection setting data for the wireless connection between the projection data providing apparatus and the projection apparatus and transmits a projection instruction and the projection data to the projection apparatus after the projection data providing apparatus and the projection apparatus are connected with each other, and the projection apparatus enters the operating mode from the sleep mode further according to the projection instruction.

7. The projection system according to claim 6, wherein the projection apparatus comprises:
   a projection unit, projecting the image light beam;
   a communication unit, communicating with the projection data providing apparatus in the wireless connection, and receiving the projection instruction and the projection data; and
   a processing unit, coupled with the projection unit and the communication unit, and driving a projection control circuit, wherein the projection control circuit controls the projection apparatus to enter the operating mode from the sleep mode according to the projection instruction and controls the projection unit to project the image light beam according to the projection data, and the projection control circuit is coupled to the processing unit.

8. The projection system according to claim 6, wherein the projection data providing apparatus comprises:
   a storage unit, storing the connection setting data;
   a communication unit, communicating with the projection apparatus in the wireless connection; and
   a processing unit, coupled with the storage unit and the communication unit, and driving a projection data processing circuit, wherein the projection data processing circuit determines whether the input operation is received and controls the communication unit to search for the projection apparatus according to the connection setting data if the input operation is received, the projection instruction and the projection data are transmitted to the projection apparatus through the communication unit after the communication unit and the projection apparatus are connected with each other, and the projection data processing circuit is coupled to the processing unit.

9. The projection system according to claim 8, wherein the processing unit is further connected to a network storage apparatus through the communication unit and receives the projection data from the network storage apparatus.

10. The projection system according to claim 1, wherein the projection apparatus enters the sleep mode from the operating mode according to a sleep instruction.

11. The projection system according to claim 1, wherein the projection data providing apparatus is a touch apparatus, and the input operation is a touch operation.

12. The projection system according to claim 1, wherein the projection data providing apparatus has a physical button or a virtual button, and the input operation is an operation of pressing the physical button or the virtual button.

13. A projection control method, applied to a projection apparatus having an operating mode and a sleep mode, the projection control method comprising:
   providing a projection data providing apparatus, determining whether an input operation is received,
   wherein if the input operation is received, projection data is transmitted to the projection apparatus to control the projection apparatus to enter the operating mode from the sleep mode and to project according to the projection data,
   wherein after determining that the input operation is received, the projection data providing apparatus further searches for the projection apparatus according to connection setting data for a wireless connection between the projection data providing apparatus and the projection apparatus and transmits the projection data to the projection apparatus after the projection data providing apparatus and the projection apparatus are connected with each other, and the projection apparatus enters the operating mode from the sleep mode according to the projection data.

14. The projection control method according to claim 13, further comprising:
   transmitting a projection instruction to the projection apparatus to control the projection apparatus to enter the operating mode from the sleep mode according to the projection instruction.

15. The projection control method according to claim 13, further comprising:
   searching for the projection apparatus according to the connection setting data to establish the wireless connection between the projection data providing apparatus capable of providing the projection data and the projection apparatus.

16. The projection control method according to claim 13, further comprising:
   sending a sleep instruction to the projection apparatus to control the projection apparatus to enter the sleep mode from the operating mode.

17. The projection control method according to claim 13, wherein the step of controlling the projection apparatus to enter the operating mode from the sleep mode and to project according to the projection data is performed by executing a projection control circuit.

18. The projection control method according to claim 13, wherein the step of determining whether the input operation is received and the step of transmitting the projection data to the projection apparatus if the input operation is received are performed by executing a projection data processing circuit.

19. The projection control method according to claim 13, further comprising:
   receiving the projection data from a network storage apparatus.

20. The projection control method according to claim 13, wherein the input operation is a touch operation.

21. The projection control method according to claim 13, wherein the input operation is an operation of pressing a physical button or a virtual button.

\* \* \* \* \*